(12) United States Patent
Han et al.

(10) Patent No.: US 11,549,162 B2
(45) Date of Patent: Jan. 10, 2023

(54) ALLOY STEEL MANUFACTURING METHOD

(71) Applicant: POSCO, Pohang-si (KR)

(72) Inventors: Woong Hee Han, Gwangyang-si (KR); Yeo Sun Yun, Gwangyang-si (KR); Soo Chang Kang, Gwangyang-si (KR); Jung Hwan Son, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 5 days.

(21) Appl. No.: 17/261,077

(22) PCT Filed: Jul. 15, 2019

(86) PCT No.: PCT/KR2019/008721
§ 371 (c)(1),
(2) Date: Jan. 18, 2021

(87) PCT Pub. No.: WO2020/022682
PCT Pub. Date: Jan. 30, 2020

(65) Prior Publication Data
US 2021/0262068 A1 Aug. 26, 2021

(30) Foreign Application Priority Data
Jul. 23, 2018 (KR) .......................... 10-2018-0085572

(51) Int. Cl.
*C22C 33/06* (2006.01)
*C21C 5/52* (2006.01)

(52) U.S. Cl.
CPC ............. *C22C 33/06* (2013.01); *C21C 5/5264* (2013.01)

(58) Field of Classification Search
CPC ............ C22C 33/06; C22C 38/00; C22C 1/02; C22C 33/04; C22C 35/005; C22C 38/04;
(Continued)

(56) References Cited

U.S. PATENT DOCUMENTS

2016/0053350 A1 2/2016 Han et al.
2019/0211425 A1* 7/2019 Han ........................ C22C 33/04

FOREIGN PATENT DOCUMENTS

CA            3029886         1/2018
CN           101381787         3/2009
(Continued)

OTHER PUBLICATIONS

KR-20140082025-A Translation (Year: 2014).*
(Continued)

*Primary Examiner* — Brian D Walck
*Assistant Examiner* — Danielle Carda
(74) *Attorney, Agent, or Firm* — Cantor Colburn LLP

(57) ABSTRACT

Provided is an alloy steel manufacturing method, the method including: preparing a manganese-containing first molten ferroalloy; preparing a chromium-containing second molten alloy; preparing molten steel; mixing the first molten ferroalloy and the second molten ferroalloy to manufacture third molten ferroalloy; and mix pouring the third molten ferroalloy and the molten steel to manufacture an alloy steel, wherein the phosphorous concentration in the molten steel may efficiently be controlled by reducing the converter end point temperature of the molten steel to improve a phosphorous control capacity during converter refining.

12 Claims, 2 Drawing Sheets

(58) Field of Classification Search
CPC ..... C22C 38/18; C21C 5/5264; C21C 7/0006; C21C 7/0645
USPC ........................................................ 420/129
See application file for complete search history.

(56) References Cited

FOREIGN PATENT DOCUMENTS

| | | |
|---|---|---|
| EP | 3084019 | 10/2016 |
| JP | S58185732 | 10/1983 |
| JP | H07278644 | 10/1995 |
| JP | H10140227 | 5/1998 |
| JP | 5985437 | 9/2016 |
| KR | 20060059277 | 6/2006 |
| KR | 100889859 | 3/2009 |
| KR | 20140082025 | 7/2014 |
| KR | 101434541 | 8/2014 |
| KR | 101439763 | 9/2014 |
| KR | 101796089 | 11/2017 |
| KR | 20180013375 | 2/2018 |
| KR | 20180024286 | 3/2018 |
| TW | 200920859 | 5/2009 |
| TW | 201823484 | 7/2018 |
| WO | 2018043835 | 3/2018 |
| WO | WO-2018043835 A1 * | 3/2018 ............. C22C 33/04 |
| WO | 2018110914 | 6/2018 |
| WO | 2018123808 | 10/2019 |

OTHER PUBLICATIONS

European Search Report—European Application No. 19841614.1 dated Mar. 24, 2021, citing KR 2014-0082025, TW 200920859, JP 5985437, WO 2018/048161, EP 3084019, and CA 3029886.
PCT Written Opinion—PCT/KR2019/008721 dated Oct. 23, 2019, citing KR 10-2014-0082025, KR 10-2018-0024286, KR 10-0889859, KR 10-2006-0059277, and JP 10-140227.
Chinese Office Action—Chinese Appiication No. 201980049293.3 dated Aug. 20, 2021, citing KR 2014-0082025, TW 200920859, US 2016/0053350, TW 201823434, CN101331787, and WO 2013/043835.
International Search Report—PCT/KR2019/008721 dated Oct. 23, 2019.

* cited by examiner

ALLOY STEEL MANUFACTURING METHOD

TECHNICAL FIELD

The present invention relates to an alloy steel manufacturing method, and more particularly, to an alloy steel manufacturing method capable of enhancing cleanliness of alloy steel and improving process efficiency.

BACKGROUND ART

In general, high manganese steels mean steels containing approximately 1-5 wt % of manganese. Recently, while high functional products such as high-strength high-formability steel materials for vehicles, steel materials for LNG tanks, and the like have been developed, high-manganese steels having increased manganese contents of approximately 24 wt % are being produced.

Among these, steel materials for LNG tanks are characterized by having high toughness at low temperatures. When manufacturing an LNG tank using steel materials for LNG tanks, welding portions necessarily occur, but the LNG tank can be used as an actual product only when degradation in toughness at weld portions and occurrence of cracks are maximally suppressed.

Accordingly, when manufacturing a base material, a method is being used in which the content of phosphorous (P) is minimized in the components of molten steel and a welding rod with a low phosphorous content is used.

In addition, steel materials for LNG tanks each contain chromium (Cr) to ensure properties, and the content of chromium is controlled by injecting a chromium-containing ferroalloy (FeCr) into molten steel after converter tapping. Since such a ferroalloy is injected into the molten steel mainly in a solid state during converter tapping, the converter end point temperature is maintained at approximately 1,700° C. in order to suppress a temperature drop in the molten steel due to injection of ferroalloy. However, when the converter end point temperature is maintained high, there is a limitation in that phosphorous (P) control capability degrades during converter refining and the phosphorous content increase in the molten steel.

In addition, in order to increase the manganese content, a manganese-containing ferroalloy (FeMn) is mainly injected into molten steel, but there is a limitation in that the phosphorous content increases in the manganese-containing ferroalloy, the time for subsequent component adjustment process (ladle furnace (LF)) or degassing process increases, and thus, process efficiency and productivity degrades.

(Prior art document 1) KR 2018-0024286 A

DISCLOSURE OF THE INVENTION

Technical Problem

The present invention provides an alloy steel manufacturing method capable of ensuring cleanliness of alloy steel.

The present invention provides an alloy steel manufacturing method capable of improving process efficiency and productivity by allowing additional processes, such as refining, to be omitted.

Technical Solution

According to an embodiment of the present invention, an alloy steel manufacturing method includes: preparing a manganese-containing first molten ferroalloy; preparing a chromium-containing second molten alloy; preparing molten steel; mixing the first molten ferroalloy and the second molten ferroalloy to manufacture third molten ferroalloy; and mixing the third molten ferroalloy and the molten steel in a molten state to manufacture alloy steel.

The preparing of the first molten ferroalloy may include: melting, in a first melting furnace, a manganese-containing raw material to manufacture a first molten ferroalloy; charging the first molten ferroalloy into a first temperature holding furnace; and holding the first molten ferroalloy at a temperature no less than a melting point.

The alloy steel manufacturing method may include refining the first molten ferroalloy after the manufacturing of the first molten ferroalloy.

The holding of the first molten ferroalloy at a temperature no less than a melting point may include charging, into the first temperature holding furnace, at least any one among manganese metal having a smaller phosphorous (P) content than the first molten ferroalloy and molten manganese, in which manganese metal is melted, to reduce a phosphorous (P) concentration in the first molten ferroalloy and increase a manganese concentration in the first molten ferroalloy.

The holding of the first molten ferroalloy at a temperature no less than a melting point may include heating the first molten ferroalloy in the first temperature holding furnace.

The preparing of the second molten ferroalloy may include: melting, in a second melting furnace, a chromium-containing raw material to manufacture a second molten ferroalloy; charging the second molten ferroalloy into a second temperature holding furnace; and holding the second molten ferroalloy at a temperature no less than a melting point.

The alloy steel manufacturing method may include refining the second molten ferroalloy after the manufacturing of the second molten ferroalloy.

The holding of the second molten ferroalloy at a temperature no less than a melting point may include charging, into the second temperature holding furnace, at least any one among chromium metal having a smaller phosphorous (P) content than the second molten ferroalloy and molten chromium in which chromium metal is melted to reduce a phosphorous (P) concentration in the second molten ferroalloy and increasing a chromium concentration in the second molten ferroalloy.

The holding of the second molten ferroalloy at a temperature no less than a melting point may include heating the second molten ferroalloy in the second temperature holding furnace.

In the preparing of the first molten ferroalloy and the second molten ferroalloy, a phosphorous concentration in the first molten ferroalloy and the second molten ferroalloy may be controlled to be approximately 350 ppm or less so that the phosphorous concentration in the alloy steel is approximately 140 ppm or less.

The manufacturing of the third molten ferroalloy may include: discharging the first molten ferroalloy stored in the first temperature holding furnace to a mixing container; and discharging the second molten ferroalloy stored in the second temperature holding furnace to the mixing container, wherein the second molten ferroalloy may be discharged earlier than the first molten ferroalloy.

The manufacturing of the third molten ferroalloy may be performed by mixing the first molten ferroalloy and the second molten ferroalloy so that a manganese components and a chromium components in the third molten ferroalloy have a ratio of approximately 6:1 to approximately 14:1.

The manufacturing of the third molten ferroalloy is performed by mixing the first molten ferroalloy and the second molten ferroalloy so that a manganese content is approximately 24 wt % or more and a chromium content is approximately 3 wt % or more with respect to a total weight of the alloy steel.

The manufacturing of the third molten ferroalloy may include: measuring, as concentration, the manganese content and the chromium content in the third molten ferroalloy; and further discharging, to the mixing container, at least any one among the first molten ferroalloy and the second molten ferroalloy according to a measured result.

In the preparing the molten steel, a temperature of the molten steel may be approximately 1,600-1,700° C.

Advantageous Effects

According to an embodiment of the present invention, the converter end point temperature of molten steel may be lowered by melting a plurality of ferroalloys used during manufacturing of alloy steel and mixing the ferroalloys with the molten steel in a molten state. Accordingly, phosphorous control capability may be improved during converter refining and the phosphorous concentration in the molten steel may efficiently be controlled. In addition, the phosphorous concentration in the alloy steel may be reduced by controlling the phosphorous concentration in a molten ferroalloy. Thus, a second refining time for controlling the phosphorous concentration in the alloy steel may be reduced and process efficiency and productivity may be improved.

In addition, since the alloy concentration may be controlled in mixing of the molten ferroalloy and the molten steel in a molten state, and since additional processes for controlling the alloy concentration may not be performed in the subsequent second refining process, it is possible to suppress not only a temperature drop in the alloy steel due to further addition of the ferroalloy, but also contamination such as nitrogen absorption and the process time may be reduced.

MODE FOR CARRYING OUT THE INVENTION

Hereinafter, embodiments of the present invention will be described in detail. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

Figure 1:
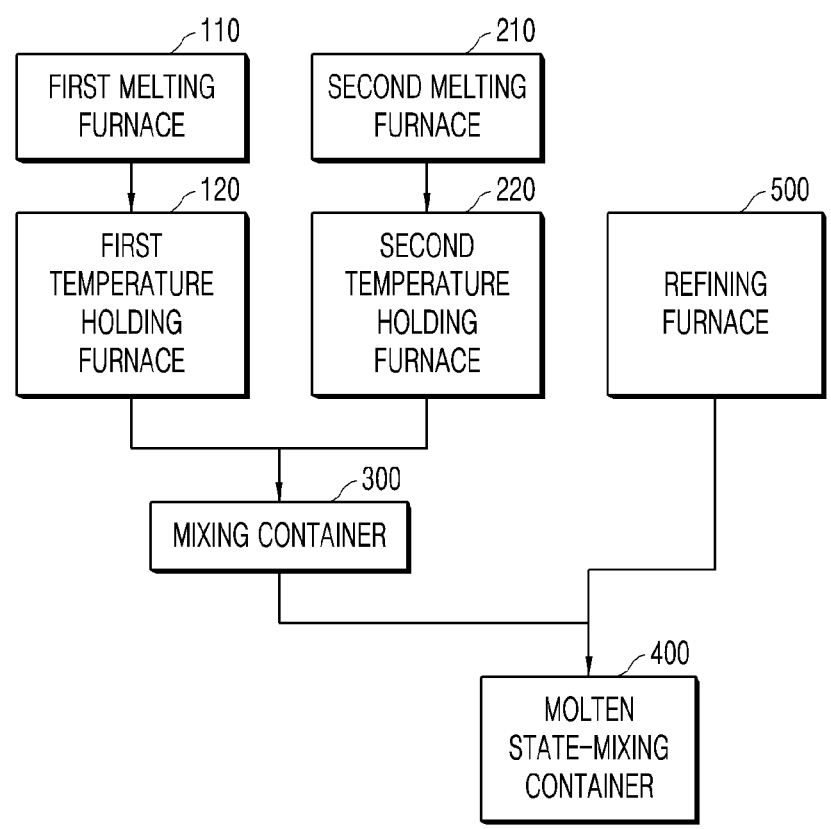
FIG. 1 is a block diagram conceptually illustrating a device for manufacturing an alloy steel through an alloy steel manufacturing method according to an embodiment of the present invention.

FIG. 1 is a block diagram conceptually illustrating a device for manufacturing an alloy steel through an alloy steel manufacturing method according to an embodiment of the present invention.

Referring to FIG. 1, an alloy steel manufacturing device according to an embodiment of the present invention may include: a first melting furnace 110 for manufacturing a first molten ferroalloy containing manganese (Mn); a first temperature holding furnace 120 in which an internal space is formed so as to store the first molten ferroalloy at a temperature no less than the melting point; a second melting furnace 210 for manufacturing a second molten ferroalloy containing chromium (Cr); a second temperature holding furnace in which an internal space so as to store the second molten alloy at a temperature no less than a melting point; a mixing container 300 for manufacturing a third molten ferroalloy by mixing the first molten ferroalloy and the second molten ferroalloy which are respectively discharged from the first temperature holding furnace 120 and the second temperature holding furnace 220; a molten state-mixing container 400 for mixing molten steel and the third molten ferroalloy in a molten state; and a refining furnace 500 for manufacturing the molten steel. Besides, the alloy steel manufacturing device may further include a raw material adding device (not shown) that can further add a raw material for the molten ferroalloy into the first temperature holding furnace 120 and the second temperature holding furnace 220.

The first melting furnace 110 and the second melting furnace 210 may each include an electric furnace capable of melting solid phase ferroalloy.

In addition, the first temperature holding furnace 120 and the second temperature holding furnace 220 may each include: a body (not shown) which has an open upper portion and in which is formed a storage space for storing a molten ferroalloy; and a cover (not shown) that may open/close the upper portion of the body. At this point, the first temperature holding furnace 120 and the second temperature holding furnace 220 only store therein mutually different type molten ferroalloys and may be formed in almost the same shape.

The body may include: an outer skin (not shown) constituting an outer shape; and refractories (not shown) built inside the outer skin. In addition, although not shown, a temperature drop in the molten ferroalloy may be more efficiently suppressed by disposing the body inside a separate housing.

A discharge port (not shown) for discharging the molten ferroalloy may be formed in the body. The discharge port may be provided to anywhere on the lateral wall or the bottom of the body as long as the molten ferroalloy can be discharged. At this point, the discharge port may be formed at a higher position than the melt surface level of the molten ferroalloy stored in the body. This is because when the molten ferroalloy is discharged for mixing with molten steel in a molten state, the molten ferroalloy is discharged by tilting the first temperature holding furnace 120 and the second temperature holding furnace 220 in the direction toward the discharge port. The discharge port may be provided with a first plug (not shown) so as to open/close the discharge port. The first plug may prevent external air from being introduced into the body through the discharge port, and prevent the molten ferroalloy from flowing our through the discharge port.

The cover may be provided so as to open/close the opening in the upper portion of the body. The cover may be installed to prevent the molten ferroalloy stored inside the body from being exposed to external air and suppress a temperature drop in the molten ferroalloy. An opening for injecting molten ferroalloy and a raw material for the molten ferroalloy may be formed in the cover. In addition, a second plug (not shown) may be provided so as to be able to open/close the opening. The second plug may open the opening when the molten ferroalloy is injected into the body, close the opening during other time, and disconnect the internal space and the outside.

Through such configuration, the first temperature holding furnace 120 and the second temperature holding furnace 220 may hold the molten ferroalloy at a constant temperature, for example, at a temperature no lower than the melting point, and minimize contact with atmospheric air.

In addition, the first temperature holding furnace 120 and the second temperature holding furnace 220 may include a gas supply part (not shown) for supplying an atmosphere gas so as to control the atmosphere inside the body. The gas supply part may supply an atmosphere gas into the body, for example, an inert gas such as argon. Accordingly, the air that may be present inside the body is discharged to the outside, and thus, contamination of the molten ferroalloy by nitrogen or oxygen contained in air may be prevented. In addition, a discharge port (not shown) may be provided to the body so that the internal pressure is maintained at a constant positive pressure. The discharge port may be open when the body internal pressure exceeds a certain pressure.

In addition, the first temperature holding furnace 120 and the second temperature holding furnace 220 may be provided with a heating part (not shown) for heating the molten ferroalloy. The heating part may be configured in various forms such as an induction coil or an electrode. Accordingly, the first temperature holding furnace 120 and the second temperature holding furnace 220 may hold the molten ferroalloy stored therein at a temperature no lower than the melting point. In addition, a heat source may be provided which is capable of melting raw materials, such as chromium metal or manganese metal added to the first temperature holding furnace 120 and the second temperature holding furnace 220.

The mixing container 300 may be used for manufacturing third molten ferroalloy by mixing the first molten ferroalloy discharged from the first temperature holding furnace and the second molten ferroalloy discharged from the second temperature holding furnace 220. The mixing container 300 may include refractories, such as a ladle, so as to store a high-temperature molten ferroalloy.

The molten state-mixing container 400 may be used for mixing of the third molten ferroalloy manufactured in the mixing container and the molten steel tapped from the refining furnace 500, for example, a converter. The molten state-mixing container 400 may include, like the mixing container 300, refractories, such as a ladle, so as to store a high-temperature melt.

Hereinafter, an alloy steel manufacturing method according to an embodiment of the present invention will be described.

Figure 2:
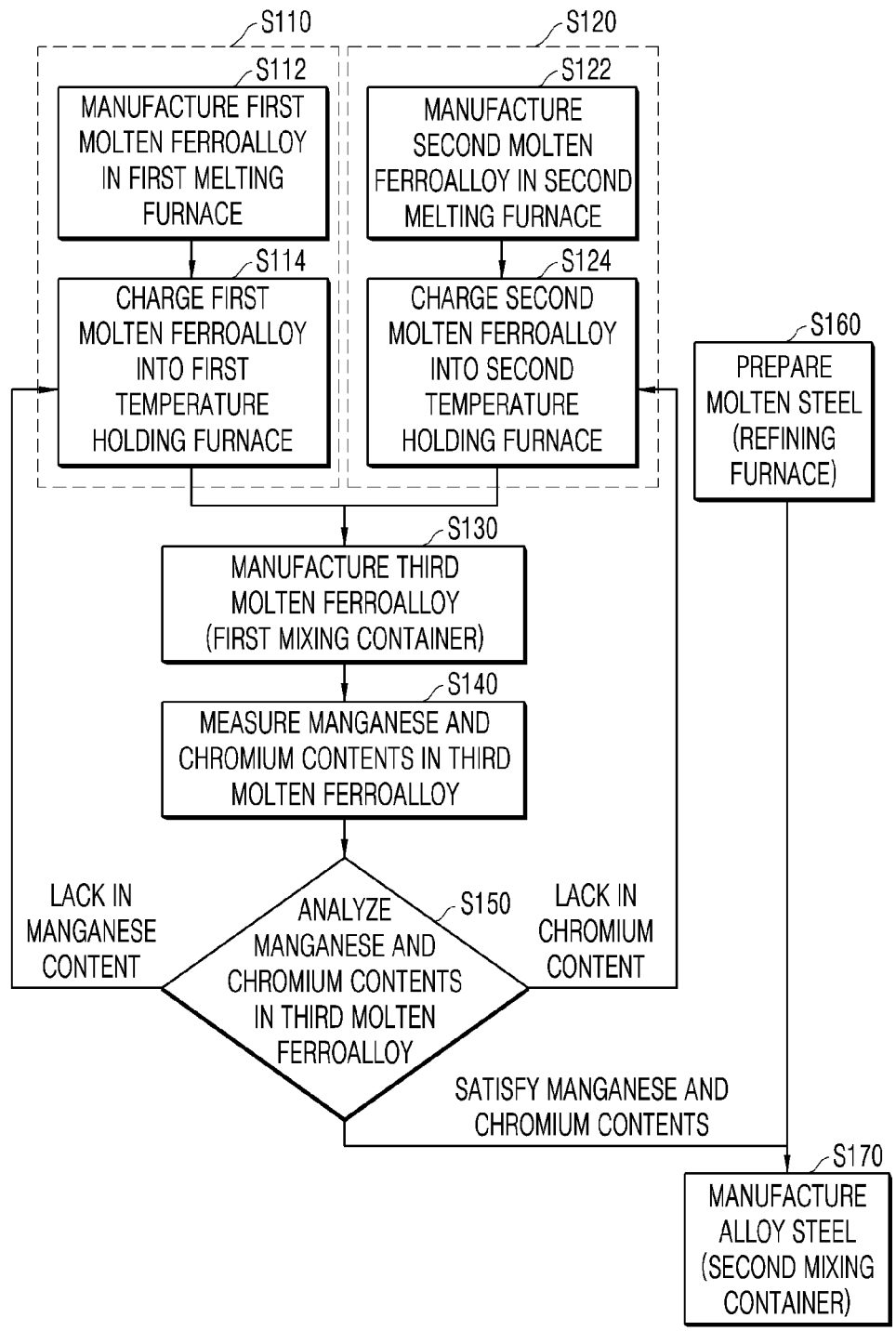
FIG. 2 is a flowchart illustrating an alloy steel manufacturing method according to an embodiment of the present invention.

FIG. 2 is a flowchart illustrating an alloy steel manufacturing method according to an embodiment of the present invention.

Referring to FIG. 2, an alloy steel manufacturing method according to an embodiment of the present invention may include: preparing a manganese-containing first molten ferroalloy, a chromium-containing second molten ferroalloy, and molten steel (S110, S120 and S160); manufacturing third molten ferroalloy by mixing the first molten ferroalloy and the second molten ferroalloy (S130); and manufacturing an alloy steel by mix pouring the third molten ferroalloy into the molten steel (S170).

First, the first molten ferroalloy may be prepared as follows.

The manganese-containing first molten ferroalloy may be manufactured (S112) by melting a manganese-containing raw material, such as manganese ferroalloy (FeMn) in a first melting furnace.

When the first molten ferroalloy is manufactured, the temperature of the first molten ferroalloy may be raised through a heating process and a refining process, and impurities, such as phosphorous (P) and carbon (C), contained in the first ferroalloy may be removed.

Subsequently, the first molten ferroalloy is charged into a first temperature holding furnace and the first molten ferroalloy may be held (S114), for example, at a temperature of approximately 1,400-1,500° C. At this point, while the first molten ferroalloy is held at a temperature of the melting point or lower in a first temperature holding furnace, at least any one among solid state manganese metal (Mn metal) and molten manganese obtained by melting manganese metal may be added to the first temperature holding furnace. At this point, the manganese metal and the molten manganese may have manganese contents of approximately 95 wt % or more, for example, approximately 95-99 wt %, and since the manganese metal and the molten manganese have low phosphorous contents, the phosphorous contents in the first molten ferroalloy stored in the first temperature holding furnace may be reduced when adding the manganese metal or the molten manganese into the first temperature holding furnace. In this case, the first molten ferroalloy stored in the first temperature holding furnace may preferably be controlled so as to have a phosphorous content no greater than approximately 350 ppm, for example, approximately 100-350 ppm. This is for controlling the alloy steel, which is manufactured through mixing with molten steel in a molten state, to have the phosphorous content no greater than approximately 140 ppm, for example, approximately 10-140 ppm.

Here, when a solid state manganese metal is added into the first temperature holding furnace, a heat source required to heat the first molten ferroalloy inside the first temperature holding furnace and melt the manganese metal may be ensured using a heating part, and a temperature drop in the first molten ferroalloy may be prevented.

In addition, the manganese concentration of the first molten ferroalloy may be increased by adding manganese metal and molten manganese which have higher manganese contents than the manganese ferroalloy. Such a process may be performed intermittently or continuously according to need. At this point, the manganese concentration in the first molten ferroalloy may be allowed to be within the range of approximately 70-80 wt %. When the manganese concentration of the first molten ferroalloy is smaller than the proposed range, there is a limitation in that the mix pouring quantity of the first molten ferroalloy increases, and the tapping quantity of molten steel should be reduced. In addition, when the manganese concentration of the first molten ferroalloy is greater than the proposed range, there is a limitation in that since the molten steel quantity produced from a converter is limited while the quantity of the first molten ferroalloy used during mix pouring decreases, the total production quantity of alloy steel decreases.

Next, the second molten ferroalloy may be prepared as follows. The chromium-containing second molten ferroalloy may be manufactured (S122) by melting a chromium-containing raw material, such as a chromium ferroalloy (FeCr) in a second melting furnace.

When the second molten ferroalloy is manufactured, the temperature of the second molten ferroalloy may be raised through a heating process and a refining process, and impurities, such as phosphorous (P) and carbon (C), contained in the second ferroalloy may be removed.

Subsequently, the second molten ferroalloy is charged into a second temperature holding furnace and the second molten ferroalloy may be held (S124), for example, at a temperature of approximately 1,400-1,500° C. At this point, while the second molten ferroalloy is held at a temperature of the melting point or lower in a second temperature holding furnace, at least any one among solid state chromium metal (Cr metal) and molten chromium obtained by melting the chromium metal may be added to the second temperature holding furnace. At this point, the chromium metal and the molten chromium may have chromium contents of approximately 95 wt % or more, for example, approximately 95-99 wt %, and since the chromium metal and the molten chromium have low phosphorous contents, the phosphorous contents in the second molten ferroalloy stored in the second temperature holding furnace may be reduced when adding the chromium metal or the molten chromium into the second temperature holding furnace. In this case, the second molten ferroalloy stored in the second temperature holding furnace may preferably be controlled so as to have a phosphorous content no greater than approximately 350 ppm, for example, approximately 100-350 ppm. This is for controlling the alloy steel, which is manufactured through mix pouring with molten steel, to have a phosphorous content no greater than approximately 140 ppm, for example, approximately 10-140 ppm. Here, when the solid state chromium metal is added into the second temperature holding furnace, a heat source required to heat the second molten ferroalloy inside the second temperature holding furnace and melt the chromium metal may be ensured using a heating part, and a temperature drop in the second molten ferroalloy may be prevented.

In addition, the chromium concentration of the second molten ferroalloy may be increased by adding chromium metal and molten chromium which have higher chromium content than a chromium ferroalloy. Such a process may be performed intermittently or continuously according to need. At this point, the chromium concentration in the second molten ferroalloy may be allowed to be within the range of approximately 70-80 wt %. When the chromium concentration of the second molten ferroalloy is smaller than the proposed range, there is a limitation in that the mix pouring quantity of the second molten ferroalloy increases, and the tapping quantity of molten steel should be reduced. In addition, when the chromium concentration of the second molten ferroalloy is greater than the proposed range, there is a limitation in that since the molten steel quantity produced from a converter is limited while the quantity of the second molten ferroalloy used during mix pouring decreases, the total production quantity of alloy steel decreases.

When the first molten ferroalloy and the second molten ferroalloy are prepared as such, the first molten ferroalloy and the second molten ferroalloy may be held at a temperature no greater than the melting point while being held at the temperature or heated until mix pouring with molten steel in the first temperature holding furnace and in the second temperature holding furnace. At this point, the first molten ferroalloy stored in the first temperature holding furnace and the second molten ferroalloy stored in the second temperature holding furnace may be stored in a quantity more than one-time mix pouring quantity, and accordingly, a mix pouring process may be continuously performed according to need.

Subsequently, when the molten steel after completing converter refining is prepared (S160), a third molten ferroalloy containing manganese and chromium may be manufactured (S130) before mix pouring with the molten steel, by discharging, to a mixing container, and mixing the first molten ferroalloy stored in the first temperature holding furnace and the second molten ferroalloy stored in the second temperature holding furnace. Here, since the manganese-containing first molten ferroalloy makes contact with atmospheric air and easily absorbs nitrogen, it is desirable to minimize the contact time with atmospheric air by discharging the first molten ferroalloy after discharging the second molten ferroalloy to the mixing container.

The third molten ferroalloy may be manufactured by mixing the manganese-containing first molten ferroalloy and the chromium-containing second molten ferroalloy. At this point, based on the total weight of the third molten ferroalloy, the first molten ferroalloy and the second molten ferroalloy may be mixed so as to have weight ratio of approximately 1.5:1 to approximately 5:1. This is a numerical value at which the composition fraction of the manganese and chromium in the third molten ferroalloy is approximately 6:1 to approximately 14:1. When mix pouring the third molten ferroalloy and the molten steel which are manufactured as such, alloy steel may be manufactured which contains approximately 25 wt % or more, for example, approximately 25-50 wt % of manganese, and approximately 3 wt % or more, for example, approximately 3-10 wt % of chromium. For example, when mix pouring the third molten ferroalloy of approximately 20-30% is mix poured with respect to the total weight of the alloy steel manufactured by mix pouring of the molten steel and the third molten ferroalloy, an alloy steel having the manganese and chromium contents within the proposed range may be manufactured.

After manufacturing the third molten ferroalloy by mixing the first molten ferroalloy and the second molten ferroalloy, the contents or concentrations of manganese and chromium in the third molten ferroalloy may be measured (S140).

In addition, the third molten ferroalloy having desired component may be manufactured by analyzing (S150) the measurement results and further adding, to the third molten ferroalloy, at least any one among the first molten ferroalloy and the second molten ferroalloy according to the analysis result. For example, when the components of the third ferroalloy is measured, the measurement results is analyzed, and the manganese content in the third molten ferroalloy is not sufficient in the third molten ferroalloy, the components of the third molten ferroalloy may be adjusted by further adding the first molten ferroalloy to the third molten ferroalloy. In addition, when the measurement result is analyzed and the chromium content in the third molten ferroalloy is not sufficient, the components of the third molten ferroalloy may be adjusted by further adding the second molten ferroalloy to the third molten ferroalloy.

When the components of the third molten ferroalloy is adjusted through such a method, and then the alloy steel is manufactured by mix pouring the third molten ferroalloy and the molten steel, a ferroalloy may not be further added in order to adjust the components of the alloy steel in the subsequent heating process (ladle furnace (LF)) or a degassing process.

Subsequently, when the manganese and chromium contents in the third molten ferroalloy are adjusted to a desired numerical value, an alloy steel in which the concentrations of manganese and chromium are adjusted by mix pouring of the molten steel and the third molten ferroalloy, may be manufactured (S170). That is, the molten steel is tapped to a mix pouring container by tilting a converter, and the third molten ferroalloy is discharged to the mix pouring container by tilting a mixing container. At this point, the molten steel and the third molten ferroalloy may be uniformly mixed by the falling force thereof to the mix pouring container.

When the alloy steel is manufactured, hydrogen components or nitrogen components in the alloy steel may be removed by performing a degassing process via a heating process. This process is performed according to need and be omitted.

Subsequently, the alloy steel may be transferred to casting equipment and be used for casting slab, steel plates, and the like.

As described above, in the present invention, molten ferroalloys having mutually different components are each manufactured, the molten ferroalloys are then mixed adequate to the components of an alloy steel to be manufactured, and the alloy steel is manufactured by mixing with molten steel in a molten state, and therefore further addition of a molten ferroalloy is not required to adjust the components of the alloy steel in the subsequent processes. Thus, a temperature drop occurring in the alloy steel due to further addition of the molten ferroalloy or contamination due to contact with atmospheric air may be minimized. In addition, process efficiency and productivity may be improved by reducing the time for adjusting the components of molten ferroalloy.

So far, although the substrate processing apparatus and the substrate processing method have been described with reference to the specific embodiments, they are not limited thereto, but limited by claims below. Therefore, it will be readily understood by those skilled in the art that various modifications and changes can be made thereto without departing from the spirit and scope of the present invention defined by the appended claims.

INDUSTRIAL APPLICABILITY

In an alloy steel manufacturing method according to embodiments of the present invention, the converter end point temperature of molten steel is lowered to improve the phosphorous control capability during converter refining, and a second refining time for controlling the phosphorous concentration in an alloy steel is thereby reduced. Thus, process efficiency and productivity may be improved.

What is claimed is:

1. An alloy steel manufacturing method comprising:
preparing a first molten ferroalloy containing manganese by melting, in a first melting furnace, a manganese-containing raw material;
charging the first molten ferroalloy into a first temperature holding furnace;
holding the first molten ferroalloy at a temperature no less than a melting point;
preparing a second molten ferroalloy containing chromium;
preparing a molten steel;
mixing the first molten ferroalloy and the second molten ferroalloy to manufacture a third molten ferroalloy; and
mixing the third molten ferroalloy and the molten steel in a molten state to manufacture an alloy steel,
wherein, before the mixing of the first molten ferroalloy and the second molten ferroalloy, the first molten ferroalloy held in the first temperature holding furnace is refined, and at least any one among solid state manganese metal and molten manganese is added to the first molten ferroalloy held in the first temperature holding furnace, the solid state manganese and the molten manganese having a phosphorous (P) content smaller than that of the first molten ferroalloy to reduce a phosphorous (P) concentration in the first molten ferroalloy and increase a manganese concentration in the first molten ferroalloy.

2. The alloy steel manufacturing method of claim 1, further comprising: heating the first molten ferroalloy held in the first temperature holding furnace before the mixing of the first molten ferroalloy and the second molten ferroalloy.

3. The alloy steel manufacturing method of claim 1, wherein the preparing of the second molten ferroalloy comprises:
melting, in a second melting furnace, a chromium-containing raw material to manufacture the second molten ferroalloy;
charging the second molten ferroalloy into a second temperature holding furnace; and
holding the second molten ferroalloy at a temperature no less than a melting point.

4. The alloy steel manufacturing method of claim 3, before the mixing of the first molten ferroalloy and the second molten ferroalloy, further comprising: refining the second molten ferroalloy held in the second temperature hold furnace.

5. The alloy steel manufacturing method of claim 3, wherein the manufacturing of the third molten ferroalloy comprises:
discharging the second molten ferroalloy held in the second temperature holding furnace to a mixing container; and
discharging the first molten ferroalloy held in the first temperature holding furnace to the mixing container in which the discharged second molten ferroalloy is held.

6. The alloy steel manufacturing method of claim 5, further comprising:
measuring manganese content and chromium content in the third molten ferroalloy; and
further discharging, to the mixing container, at least any one among the first molten ferroalloy and the second molten ferroalloy according to a measured result.

7. The alloy steel manufacturing method of claim 1, before the mixing of the first molten ferroalloy and the second molten ferroalloy, further comprising: adding at least any one among solid state chromium metal and molten chromium to the second molten ferroalloy held in the second temperature holding furnace, the solid state chromium and the molten chromium having a phosphorous (P) content smaller than that of the second molten ferroalloy to reduce a phosphorous (P) concentration in the second molten ferroalloy and increase a chromium concentration in the second molten ferroalloy.

8. The alloy steel manufacturing method of claim 7, wherein the phosphorous concentration of the first molten ferroalloy and the phosphorous concentration of the second molten ferroalloy are controlled to be 350 ppm or less, respectively, so that a phosphorous concentration of the alloy steel is 140 ppm or less.

9. The alloy steel manufacturing method of claim 1, before the mixing of the first molten ferroalloy and the second molten ferroalloy, further comprising: heating the second molten ferroalloy held in the second temperature holding furnace.

10. The alloy steel manufacturing method of claim 1, wherein a ratio of a manganese component to a chromium component in the third molten ferroalloy is 6:1 to 14:1.

11. The alloy steel manufacturing method of claim 1, wherein a manganese content of the third ferroalloy is 24 wt % or more with respect to a total weight of the alloy steel, and a chromium content of the third ferroalloy is 3 wt % or more with respect to the total weight of the alloy steel.

12. The alloy steel manufacturing method of claim 1, wherein a temperature of the molten steel is 1,600-1,700° C.

* * * * *